US011490760B2

(12) United States Patent
Dubief et al.

(10) Patent No.: US 11,490,760 B2
(45) Date of Patent: Nov. 8, 2022

(54) BEVERAGE DISPENSER WITH A PLURALITY OF DISSOLUTION CHAMBERS

(71) Applicant: SOCIETE DES PRODUITS NESTLE S.A., Vevey (CH)

(72) Inventors: Flavien Dubief, Champagne (CH); Lucio Scorrano, Yverdon-les-Bains (CH); Larry Baudet, Font (CH); Samuel Chevalley, Yverdon-les-Bains (CH)

(73) Assignee: Societe des Produits Nestle S.A., Vevey (CH)

(*) Notice: Subject to any disclaimer, the term of this patent is extended or adjusted under 35 U.S.C. 154(b) by 319 days.

(21) Appl. No.: 16/956,702

(22) PCT Filed: Dec. 17, 2018

(86) PCT No.: PCT/EP2018/085178

§ 371 (c)(1),
(2) Date: Jun. 22, 2020

(87) PCT Pub. No.: WO2019/121499

PCT Pub. Date: Jun. 27, 2019

(65) Prior Publication Data

US 2020/0329900 A1 Oct. 22, 2020

(30) Foreign Application Priority Data

Dec. 22, 2017 (EP) .................................... 17210235

(51) Int. Cl.
*A47J 31/40* (2006.01)
*A47J 31/44* (2006.01)
(Continued)

(52) U.S. Cl.
CPC ......... *A47J 31/401* (2013.01); *A47J 31/4403* (2013.01); *A47J 31/3695* (2013.01);
(Continued)

(58) Field of Classification Search
CPC .. A47J 31/401; A47J 31/4403; A47J 31/3695; A47J 31/404; A47J 31/4492; A47J 31/46
See application file for complete search history.

(56) References Cited

U.S. PATENT DOCUMENTS

| | | | | |
|---|---|---|---|---|
| 9,173,517 | B2 * | 11/2015 | Bulgin | A47J 31/402 |
| 11,208,315 | B2 * | 12/2021 | Crawford | B67D 1/0888 |

(Continued)

FOREIGN PATENT DOCUMENTS

| | | |
|---|---|---|
| WO | 2013124188 | 8/2013 |
| WO | 2016016240 | 2/2016 |
| WO | 2016169778 | 10/2016 |

*Primary Examiner* — Michael Collins
(74) *Attorney, Agent, or Firm* — K&L Gates LLP

(57) ABSTRACT

The invention concerns a system of: —a beverage preparation apparatus, wherein said apparatus comprises a mainframe (1) supporting a diluent supply (4), at least two container areas (11) with identification means reader device (13), at least two dissolution chamber areas (12), with identification means reader (14), and a user interface (16), and—a multiplicity of containers (2), with identification means (23) identifying the nature of the soluble beverage ingredient the container is designed to store, and—a multiplicity of dissolution chambers (3) with identification means (34) identifying the nature of the soluble beverage ingredient the dissolution chamber is designed to dissolve, wherein the apparatus comprises a control system (18) configured for comparing, for each pair of a container housed in a container area and a dissolution chamber housed in the chamber area positioned under the container area and receiving the soluble beverage ingredient from said container, the identification means (34) of the dissolution chamber and the identification means (23) of the container.

10 Claims, 10 Drawing Sheets

(51) Int. Cl.
*A47J 31/36* (2006.01)
*A47J 31/46* (2006.01)

(52) U.S. Cl.
CPC .......... *A47J 31/404* (2013.01); *A47J 31/4492* (2013.01); *A47J 31/46* (2013.01)

(56) References Cited

U.S. PATENT DOCUMENTS

2010/0058931 A1* 3/2010 Righetti ................ A47J 31/401 222/145.6
2012/0006204 A1* 1/2012 Eidenschink ....... G07F 17/0071 99/279
2012/0035761 A1* 2/2012 Tilton .................. B67D 1/0057 700/239
2018/0130141 A1* 5/2018 Carpenter .............. G06Q 50/12
2020/0329900 A1* 10/2020 Dubief .................. A47J 31/401

* cited by examiner

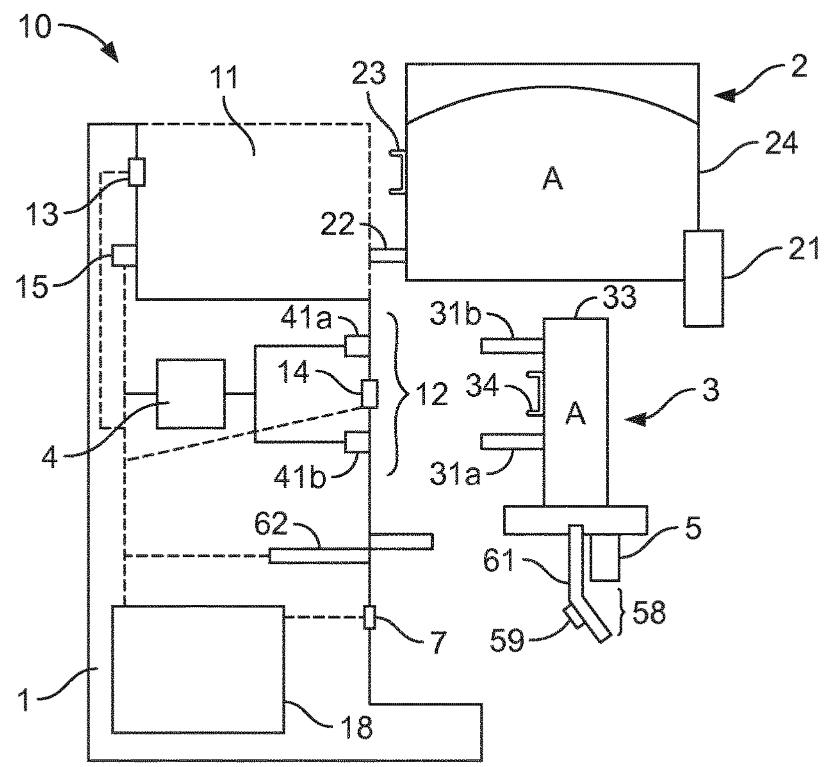
FIG. 2C
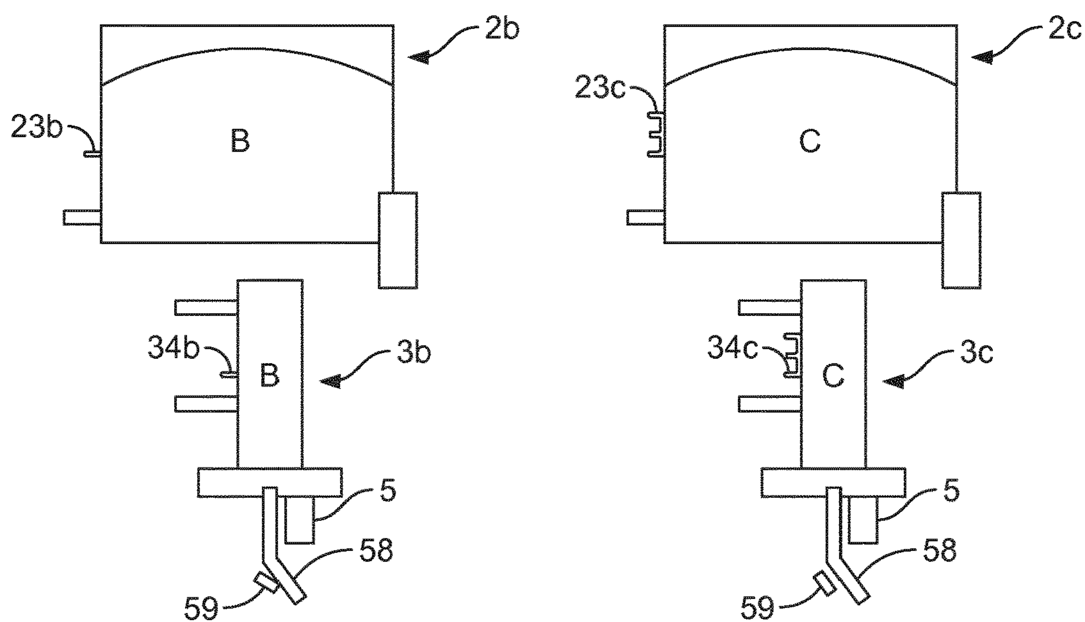
FIG. 2D
FIG. 2E

BEVERAGE DISPENSER WITH A PLURALITY OF DISSOLUTION CHAMBERS

CROSS REFERENCE TO RELATED APPLICATIONS

The present application is a National Stage of International Application No. PCT/EP2018/085178, filed on Dec. 17, 2018, which claims priority to European Patent Application No. 17210235.2, filed on Dec. 22, 2017, the entire contents of which are being incorporated herein by reference.

FIELD OF THE INVENTION

The present invention relates to beverage apparatus preparing different types of beverages, each beverage being obtained by mixing a dose of soluble powder with a diluent into a dissolution chamber.

BACKGROUND OF THE INVENTION

In the field of beverage preparation apparatus, the biggest apparatus enable the preparation of different types of beverages depending on the selection made by the consumer. For example, such apparatus enable alternatively the preparation of coffee, milk, chocolate or tea and mixtures of said beverages, usually mixtures of milk with coffee, chocolate or tea.

In order to provide this large choice of different beverages, the apparatus comprises several containers storing separately different beverage ingredients such as coffee, tea, milk and chocolate soluble powders and several dissolution chambers each dedicated to the preparation of the different beverages.

Usually the apparatus comprises two or three different dissolution chambers and at least four containers storing different ingredients since some chambers are able to dissolve different ingredients (for example the same chamber can be used for regular coffee and decaffeinated coffee).

During the day, different types of beverages are preferably ordered by consumers. In the morning, tea, chocolate and black coffee are ordered, whereas after the lunch, essentially coffee beverages (espresso, black coffee, latte and cappuccino) are ordered. In the evening, the demand is reduced and coffees and teas are preferred.

These habits of the consumers force the operator of the apparatus to dismantle the dissolution chambers hold in the apparatus several times a day in order to be able to satisfy the demands: variety in the morning, coffee beverages after lunch and coffee and teas in the evening.

Each time the operator reassembles the chambers in the apparatus, he/she must simultaneously check if the containers above store the beverage ingredient corresponding to the dissolution chambers too. For example, it a coffee dissolution chamber used in the evening is replaced by milk chamber the next morning, then the container storing coffee the day before must be replaced a container storing milk in the morning. Feeding incorrectly a dissolution chamber with an ingredient it is not dedicated to leads to a beverage of poor quality, potential overflow problems and cross contamination of the chambers with the consequence of a deeper cleaning next time the chamber is cleaned.

Now there is need for decreasing the time for these dismantling and reassembling operations to limit the period of time during which the dispenser is not operable. There is also a need for having this operation made by any non-trained person so that it is not necessary to ask a specific operator to come and customize the machine. The operation should be made by any person briefly trained on the cleaning operations.

There is a need for improving the operation of dismounting and reassembling the beverage dissolution chambers of the apparatus.

It would be advantageous to provide an apparatus avoiding wrong reassembling in particular wrong association of a dissolution chamber with its corresponding container storing beverage ingredient.

It would be advantageous to enable the operator to prepare ready-to-use assemblies of several beverage dissolution chamber.

SUMMARY OF THE INVENTION

There is provided system of a beverage preparation apparatus, a multiplicity of containers and a multiplicity of dissolution chambers.

The beverage preparation apparatus comprises a main frame supporting the functional components of the apparatus, part of said components comprising:

- a diluent supply system,
- a container area configured for positioning at least two removable containers in the frame, said containers being configured for storing and dispensing a soluble beverage ingredient, and the container area comprising at least one identification means reader device to identify each container or a combination of containers hold in said container area,
- a dissolution chamber area configured for positioning at least two removable dissolution chambers so that each dissolution chamber is positioned under one container so that said dissolution chamber receives a dose of soluble beverage ingredient from the container positioned above the dissolution chamber, and each dissolution chamber area comprising at least one connection to the diluent supply, the dissolution chamber area comprising at least one identification means reader configured to identify each dissolution chamber or a combination of chambers positioned in said dissolution chamber area, and
- a user interface.

In the multiplicity of containers, each container is configured for storing and dispensing a soluble beverage ingredient, and each container or a combination of containers is designed to be removably positioned inside the container area of the apparatus, and each containers or combination of containers comprises an identification means identifying the nature of the soluble beverage ingredient the container is designed to store.

In the multiplicity of dissolution chambers, each dissolution chamber is configured for preparing a beverage from a dose of soluble beverage ingredient and a dose of diluent, and each chamber is designed to be removably positioned inside a chamber area of the apparatus, and each chamber comprises:

- at last one diluent inlet designed to removably cooperate with at least one connection to the diluent supply of the chamber area, and
- one powder inlet designed to receive the dose of soluble beverage ingredient from the container positioned in the container area above the chamber area, and
- one beverage dispensing outlet, and each dissolution chamber presents an internal design configured to dissolve one dedicated type of soluble beverage ingredient, and each dissolution chamber or a combination of chambers is designed to be removably positioned inside the chamber area of the apparatus, and each dissolution chamber or the combination of chambers comprises an identification means identifying the nature of the soluble beverage ingredient each dissolution chamber is designed to dissolve.

In the system, the apparatus comprises a control system configured for comparing, for each pair of a container housed in a container area and a dissolution chamber housed in the chamber area positioned under the container area and receiving the soluble beverage ingredient from the container, the identification means of the dissolution chamber or of the combination of chambers and the identification means of the container or of the combination of containers.

Usually, in the system, the number of dissolution chambers is greater than the number of chambers that can positioned in the chamber area inside the apparatus and the number of containers is greater than the number of containers that can be positioned in the container area inside the apparatus. As a consequence, different configurations of containers and dissolution chambers can be set inside the apparatus, with the result that the apparatus is able to offer different beverages depending on the configuration set in the apparatus.

The beverage dispenser of the present invention comprises a frame in which the different functional elements for preparing the beverages are positioned.

In particular, the frame supports the diluent supply system providing the diluent to prepare the beverages. The diluent can be any suitable liquid adapted for dissolving a soluble beverage ingredient. A preferred diluent is water either hot or cold. Generally the diluent supply system of the apparatus comprises at least a diluent tank or diluent supply (such as tap water), a diluent pump, a diluent heater and/or cooler and valves for actuating the diluent delivery. The system can also comprise a selection valve for delivering diluent at either hot or cold temperature.

The main frame comprises a container area configured for positioning removable containers in the frame. The containers to be positioned in the container area are configured for storing soluble beverage ingredients. Usually, each container comprises a storing tank and an ingredient outlet. Usually the outlet is positioned at the bottom of the tank. The containers can be attached together and form a combination of specific containers. For example, a combination of containers can be defined for the dedicated preparation of milk and coffee beverages; this combination comprises two containers, one comprising a milk ingredient, the other a coffee ingredient. This combination of the two containers enables the loading of the two containers simultaneously in the apparatus. The containers of the combination can be attached one to the other in a removable or non-removable manner. In one particular embodiment, the containers can be combined together in a drawer such as described in WO 2013/014142.

The container area comprises at least one identification means reader device.

Each container to be positioned in the container area comprises an identification means identifying the nature of the soluble beverage ingredient the container is designed to store. In the case of combination of containers, the combination comprises an identification means identifying the nature of the soluble beverage ingredient each container of the combination is designed to store and the physical position of each container in the combination of containers.

The reader device and the identification means are positioned in the area and in the container or the combination of containers so that once the container or the combination of containers is in the area, the reader is able to read the identification means. As a result, the control system of the apparatus is able to identify each container hold in said container area and the nature of the soluble beverage ingredient each container is designed to store.

Generally, the system comprises at least one soluble beverage ingredient dosing device, preferably one dosing device per container. The dosing device delivers the dosed powder to a dissolution chamber.

When the ingredient is a powder, the dosing device is preferably a rotatable volumetric dosing member. The devices for dosing can be comprised in the list of a dosing screw, a dosing auger or perforated discs. Depending on the type of container the dosing device can be integrated inside the container or provided at the outlet of the container. According to the preferred embodiment the dosing device is placed inside the container and positioned at the bottom of the container. It is preferably a spring or screw auger. Such augers displace a volume of powder from the container to the powder outlet. This sub-assembly composed of the container and the dosing device is usually identified as a canister in current beverage dispensers.

When the ingredient is a concentrate, the dosing device is preferably a peristaltic pump cooperating with a flexible tube filled with the concentrate.

The main frame comprises a dissolution chamber area configured for positioning removable dissolution chambers in the apparatus so that each dissolution chamber is positioned under one container and that said dissolution chamber receives a dose of soluble beverage ingredient from the container positioned above the dissolution chamber. The dissolution chamber area is positioned under the area of the container so that the ingredient can be dispensed from the containers in the chambers by gravity fall.

In addition the dissolution chamber area comprises at least one connection to the diluent supply so that each chamber positioned in this area can be connected to the diluent supply system.

Each dissolution chamber to be positioned in the dissolution chamber area is configured for preparing a beverage from a dose of soluble beverage ingredient and a dose of diluent, and the chamber is designed to be removably positioned inside a chamber area of the apparatus.

Usually the chamber comprises:

at last one diluent inlet designed to removably cooperate with at least the connection to the diluent supply system in the chamber area, and one powder inlet designed to receive the dose of soluble beverage ingredient from the container positioned in the container area above the chamber area. Usually this inlet corresponds to the opened top of the chamber.

one beverage dispensing outlet. Usually, the dispensing outlet is positioned at the bottom of the chamber.

The dissolution chamber is usually designed so as to make an efficient contact of the soluble beverage ingredient and the diluent and improve the dissolution of the ingredient to produce the beverage.

Preferably, the dissolution chamber can comprise at least one diluent inlet configured for introducing the diluent in the form of a jet inside the chamber. The chamber is preferably configured so that a whirlpool of liquid is created in the chamber and the jet of diluent hits said whirlpool. Such a dissolution chamber is described in WO 2008/071613. According to the preferred embodiment said dissolution chamber comprises one diluent inlet positioned close to the bottom of the chamber. In an alternative embodiment said chamber comprises an additional diluent inlet positioned close to the top. Diluent introduced through the higher inlet is usually used to rinse the chamber after a beverage preparation or to prepare big sized beverages.

Preferably, the chamber is devoid of whipper because whipper require more time for cleaning.

Generally the top of the dissolution chamber is opened so that powder can freely flow inside by gravity fall. By opened it is meant that the top of the chamber is not covered e.g. by a lid.

Each chamber presents an internal design configured to dissolve one dedicated type of soluble beverage ingredient. Accordingly, at least two chambers can differ by their internal configurations. This is the case when one chamber is configured for preparing coffee and another chamber is configured for preparing milk. With dissolution chambers such as described above, chambers can differ by:

- their internal volume, and usually their internal diameter if the chambers are cylindrical, and/or
- the design of their internal surface, and/or
- the orientation of the diluent inlet inside the chamber. Actually, the jet of water provided by the diluent inlet can be inclined differently inside the chamber depending on the required dissolution effect, and/or
- the cross section and/or the shape of the beverage dispensing outlet.

At least for this reason:

- each dissolution chamber comprises an identification means identifying the nature of the soluble beverage ingredient the dissolution chamber is designed to dissolve, or
- each combination of chambers comprises an identification means identifying the nature of the soluble beverage ingredient each of the dissolution chamber of the combination is designed to dissolve and the physical position of each chamber in the combination of chambers.

In addition the dissolution chamber area comprises at least one identification means reader configured to identify the dissolution chamber or the combination of chambers positioned in said area.

Similarly to the containers, the dissolution chambers can be attached together and form a combination of specific chambers. For example, a combination of chambers can be defined for the dedicated preparation of milk and coffee beverages; this combination comprises two chambers, one configured for preparing a milk beverage by dissolution of a milk ingredient, the other for preparing a coffee beverage by dissolution of a coffee ingredient. This combination of the two chambers enables the loading of the two chambers simultaneously in the apparatus. The chambers of the combination can be attached one to the other in a removable or non-removable manner.

Each chamber area comprises at least one identification means reader device and each chamber or combination of chambers to be positioned in the chamber area comprises an identification means identifying the nature of the soluble beverage ingredient each chamber or each chamber of the combination of chamber is designed to dissolve. The reader device is positioned in the chamber and the identification means is positioned area on the chamber or on the combination of chambers so that once the chamber or the combination of chambers is in the area, the reader is able to read the identification means. As a result, the control system of the apparatus is able to identify each chamber hold in said chamber area and the nature of the soluble beverage ingredient each chamber is designed to dissolve.

The apparatus comprises a user interface. This interface enables the display of information to the consumer, in particular information about the types of beverages that can be dispensed from the beverage preparation apparatus.

This interface enables too the input of a selection by the consumer and the ordering of the selected beverage.

The apparatus comprises a control system operable to control the components hold in the apparatus to perform a beverage preparation operation.

In addition, the control system is configured for comparing, for each pair of a container housed in a container area and a dissolution chamber housed in the chamber area positioned under the container area and receiving the soluble beverage ingredient from said container, the identification means of the dissolution chamber and the identification means of the container.

Accordingly, in the system of the beverage preparation apparatus wherein containers are positioned in the container area and dissolutions chambers are positioned in dissolution chamber area, the control system is able to read for each pair of a container and a dissolution chamber associated to said container the identification means of the container and the identification means of the dissolution chamber. Then, the control system is able to compare this pair of identification means.

When a combination of containers is positioned in the container area, the identification means enables the control system to read the physical position of each container and the ingredient this container is designed to store.

Similarly, when a combination of chambers is positioned in the container area, the identification means enables the control system to read the physical position of each chamber and the ingredient this chamber is designed to dissolve.

Preferably, if, for one pair of a container and a dissolution chamber receiving the soluble beverage ingredient from said container, a discrepancy between the nature of the soluble beverage ingredient the dissolution chamber is designed to dissolve and the nature of the soluble beverage ingredient the container is designed to store is detected, then an alert is displayed through the user interface of the beverage preparation apparatus.

Indeed, the discrepancy indicates that the type of dissolution chamber is not configured for preparing a beverage from the soluble beverage ingredient stored in the container. The control system can be configured to alert and display information about the nature of the ingredient in the container and the nature of the ingredient that can be dissolved in the chamber on the user interface so that the operator is able to check if he/she desires to remove the container of soluble beverage ingredient or the dissolution chamber. In addition or alternatively, the control system can be configured to explain the operator how to change either the container(s) or the chamber(s).

Preferably, if, for all pairs of a container and a dissolution chamber receiving the soluble beverage ingredient from said container, no discrepancy between the nature of the soluble beverage ingredient the dissolution chamber is designed to dissolve and the nature of the soluble beverage ingredient the container is designed to store is detected, then the natures of the beverages able to be prepared by the pairs of container and dissolution chamber are displayed through the user interface.

Accordingly, the display of the natures of the beverages enable the consumer to choose and select his/her beverage.

In one first mode, the apparatus comprises a sub-frame, said sub-frame being removably attached to the main frame, and said sub-frame being configured for holding the dissolution chambers to be positioned in the dissolution chamber area of the apparatus, and said sub-frame being designed to position each chamber in one dissolution chamber area, each of said chamber comprising an identification means, and said sub-frame being designed to position the identification means of each dissolution chamber hold in the sub-frame in relation to the identification means reader of said dissolution chamber area.

Accordingly, when the sub-frame is removed from the main frame of the apparatus, all the chambers are simultaneously removed from the apparatus. In one gesture, the operator removes all the chambers. And inversely the sub-frame holding all the chamber enables the positioning and attachment of all chambers in the apparatus in one gesture.

Preferably, the chambers are removable from the sub-frame. Consequently, once the sub-frame has been removed from the apparatus, it becomes easy to separate each chamber from the sub-frame. The operator is able to operate on a table or one side of a sink. Inconvenient handling inside the apparatus is not necessary any longer.

Preferably the sub-frame comprises sub-areas, each of these sub-areas being configured for receiving one dissolution chamber and for orienting the conduit of the at least one diluent inlet of said chamber.

Usually the sub-areas are identical. Accordingly, any chambers can be hold in any sub-areas, which can facilitate the maintenance when the operator introduce the chambers back in the sub-frame after cleaning.

Preferably each sub-areas presents a top opening, through which each chamber can slide.

According to the preferred embodiment, for each dissolution chamber, the at least one diluent inlet comprises a conduit extending outside the external surface of the chamber. In that embodiment, each sub-area of the sub-frame is preferably configured for orienting the conduit of the at least one diluent inlet of the chamber. The orientation of the conduit is defined in order to enable this conduit to easily fit inside a corresponding hole of the frame of the apparatus so as to provide connection with the liquid supply system. Preferably, the sub-area is configured for orienting the conduit perpendicularly to the back face/plane of the sub-frame. With that aim, each of the sub-areas of the sub-frame can comprise a longitudinal slot to hold the conduit.

Preferably all the chambers present the same external configuration. This identical external aspect enables their placement in whatever sub-areas of the sub-frame.

Preferably, for all the chambers, the conduit of the at least one diluent inlet is positioned at the same place and oriented in the same direction, and the external volume of the chamber is the same. Usually, the chambers present a cylindrical external aspect and all the chambers present the same external diameter.

Consequently, each chamber can be indifferently positioned in each sub-area and can be connected to a diluent supply hole.

Consequently, the sub-frame enables the operator to prepare the different chambers he/she wants to position inside the apparatus in a first step outside the apparatus. It is quite easy to introduce the chambers in the sub-frame outside the machine, for example on a table, and then to introduce the sub-frame in the apparatus.

According to one embodiment, the system can comprise at least two sub-frames, said sub-frames holding selected dissolution chambers, and the sub-frames differing by the selection of chambers.

This embodiment enables the operator to change the configuration of the beverage preparation apparatus by simply changing from one particular sub-frame to another one in place of having to remove the chambers from one single sub-frame and then to re-introduce new chambers in the same sub-frame in order to get a new configuration of the apparatus.

The operator can prepare ready-to-use sub-frames, for example: a first sub-frame with chambers dedicated to the preparation of the beverages usually ordered in the morning, another sub-frame for the beverages usually ordered after the lunch and a third sub-frame for the beverages usually ordered in the evening. The time to change the configuration of the machine becomes very short and reduces the time during which the machine cannot be operated.

Preferably, the sub-frame is positioned in a receiving area of the main frame of the apparatus. The receiving area defines a volume inside the apparatus for positioning and holding the sub-frame—and the chambers hold in the sub-frame—inside the apparatus.

According to the preferred embodiment, the sub-frame is a drawer and the drawer is able to slide horizontally in the main frame.

Usually, the sub-frame and the frame comprises cooperating guiding means in order to enable a better handling of the sub-frame during the withdrawal from or the introduction in the main frame.

Preferably, the apparatus a device to lock the sub-frame in the main frame. Any known locking device like a lever, can be used.

According to one embodiment of the sub-frame:

- the dispensing outlet of each chamber communicates with a flexible tube, and
- each flexible tube is part of the sub-frame, and
- for each flexible tube, the apparatus comprises a corresponding pinching actuator able to slide in and out of the surface of the receiving area.

Consequently, the outlets of the chambers are closed by pinching valve. This type of valve is commanded by a pinching actuator that can be hidden behind the surface of the receiving area when the sub-frame is dismantled.

Preferably, the sub-frame comprises at least two dispensing conduits, each dispensing conduit cooperating with the dispensing beverage outlet of one dedicated chamber and supplying beverage to a final beverage dispensing area, and the dispensing conduits are designed in a dispensing block of the sub-frame.

In a particular embodiment, the system can comprise at least two sub-frames, wherein the at least two sub-frames differ by the configuration of the final beverage dispensing area of the dispensing block, and

- wherein each sub-frame comprises an identification means identifying the configuration of the final beverage dispensing area of the dispensing block, and
- wherein the frame comprises one identification means reader device able to identify the sub-frame, and
- wherein the control system of the apparatus is configured for adapting the display of the user interface.

In one second mode, the apparatus comprises a sub-frame, said sub-frame being removably attached to the main frame, and said sub-frame being configured for holding a combination of dissolution chambers to be positioned in the dissolution chamber area of the apparatus, wherein said chambers are non removable form the sub-frame, and wherein the sub-frame comprising an identification means of the combination of chambers, said identification means identifying:

the nature of the soluble beverage ingredient each of the dissolution chamber of the combination is designed to dissolve, and the physical position of each chamber in the sub-frame, and wherein the sub-frame is designed to position the identification means in relation to one identification means reader in the chamber area.

According to this second mode, the dissolution chambers are attached in the sub-frame in a non-dismountable manner. Preferably, the assembly of the dissolution chambers and the sub-frame are made of one single piece of material. Such an assembly can be injection molded.

In that second mode, the operator does not need to dismount the chambers from the sub-frame for cleaning or preparing a beverage offer, the whole sub-frame is ready to be used.

With that embodiment, the operations of dismantling the chambers from the sub-frame and re-assembling them after cleaning do not happen saving time and errors for the operator.

Preferably, the sub-frame is positioned in a receiving area of the main frame of the apparatus. The receiving area defines a volume inside the apparatus for positioning and holding the sub-frame inside the apparatus.

According to the preferred embodiment, the sub-frame is a drawer and the drawer is able to slide horizontally in the main frame.

Usually, the sub-frame and the frame comprises cooperating guiding means in order to enable a better handling of the sub-frame during the withdrawal from or the introduction in the main frame.

Preferably, the apparatus a device to lock the sub-frame in the main frame. Any known locking device like a lever, can be used.

Preferably, the system comprises a multiplicity of such sub-frames and these sub-frames differ by the type and/or the position of the chambers hold in each sub-frame.

A set of different sub-frames can be provided so that the operator is able to customise the beverage proposed in the beverage preparation apparatus. For example, one sub-frame can comprise two chambers both designed for preparing coffee in dispensing coffees in different drinking receptacles and another sub-frame can comprise one chamber designed for preparing coffee and one chamber for preparing foamed milk in the same drinking receptacle.

The sub-frame comprises one identification means identifying the type of chamber, that is the nature of the soluble beverage ingredient each of the dissolution chamber of the sub-frame is designed to dissolve, and the physical position of each chamber in the sub-frame.

In one embodiment, the system can comprise a multiplicity of such sub-frames and these sub-frames differ by the orientation of the dispensing conduits cooperating with the dispensing beverage outlets of each dedicated chamber and supplying beverage to a final beverage dispensing area.

The identification means of the sub-frame can identify the orientation of the dispensing conduits. Accordingly the control system of the apparatus can be configured for adapting the display of the user interface accordingly.

The beverage ingredient used in the apparatus of the present invention can be a soluble beverage powder or a beverage concentrate.

Such a soluble beverage powder can be instant coffee powder, chocolate powder, milk powder, instant tea powder, a fruit powder, a soup powder.

Such a beverage concentrate can be a coffee concentrate, milk concentrate, tea concentrate, a syrup.

In the present application the terms “internal”, “external”, “back”, “front”, “bottom” and “top” are used to describe the relational positioning of features of the invention. These terms should be understood to refer to the components of the apparatus in their normal orientation when positioned in the apparatus for the production of a beverage as shown in the FIGS. 2, 3*a* and 3*b*.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures:

FIGS. 2*a*-2*e* are schematic views of a system according to the invention in different operational states.

DETAILED DESCRIPTION OF THE DRAWINGS

Figure 1A:
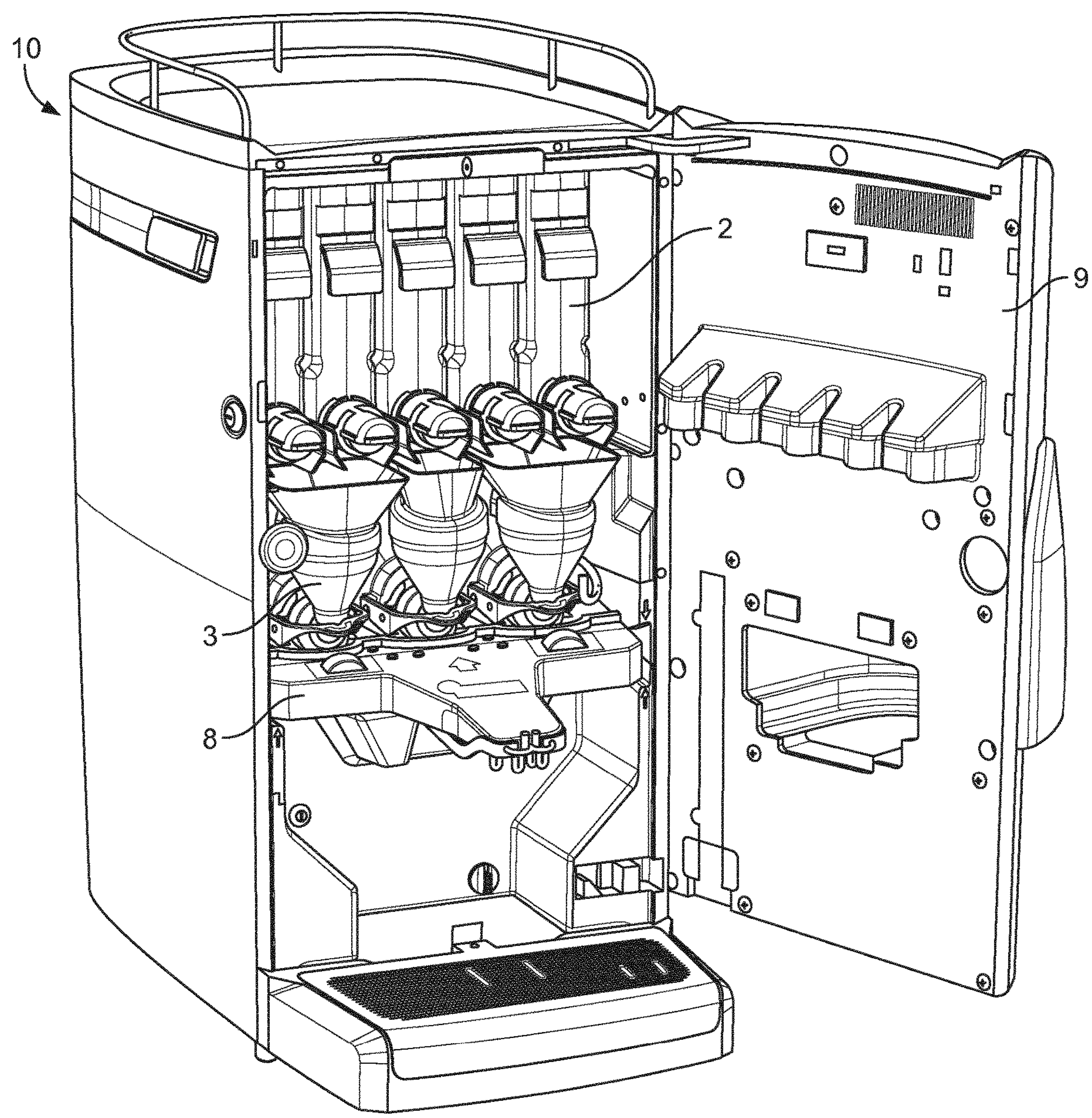
FIGS. 1*a* and 1*b* illustrate a beverage preparation apparatus according to the state of the art.

FIG. 1*a* illustrates a beverage preparation apparatus 1 of the state of the art, the front door being opened to show the inside of the apparatus.

Internally, the frame of the apparatus supports five containers 2 storing difference soluble beverage ingredients. The outlets 21 of these containers dispense doses of ingredients in three dissolution chambers 3 positioned downwardly. These chambers prepare beverages and the beverages are dispensed through beverage tubes hold in a manifold 8. The beverages are dispensed in a cup that can be positioned on a drip tray at the bottom of the apparatus. The manifold enables the preparation of one beverage after another.

The containers can store powder ingredients such as instant coffee, milk powder, instant tea powder, cocoa powder. Two dissolution chambers are configured to dissolve powders dispensed from two different containers, either because these containers store the same powder ingredient or because the containers store a similar ingredient such as instant coffee and decaffeinated instant coffee.

The cleaning of such an apparatus requires that each chamber 3 is removed from the apparatus one after the other and that each chamber is further dismantled. After dismantling, cleaning and reassembling, each chamber must positioned back at the right original place in the apparatus.

In another step, the manifold 8 is dismantled too, cleaned, reassembled and positioned back in the apparatus.

The containers can also be removed from the dispenser in order to be refilled or to replace one container comprising a specific ingredient with a container comprising another ingredient in order to change the beverages offer supplied by the apparatus.

Figure 1B:
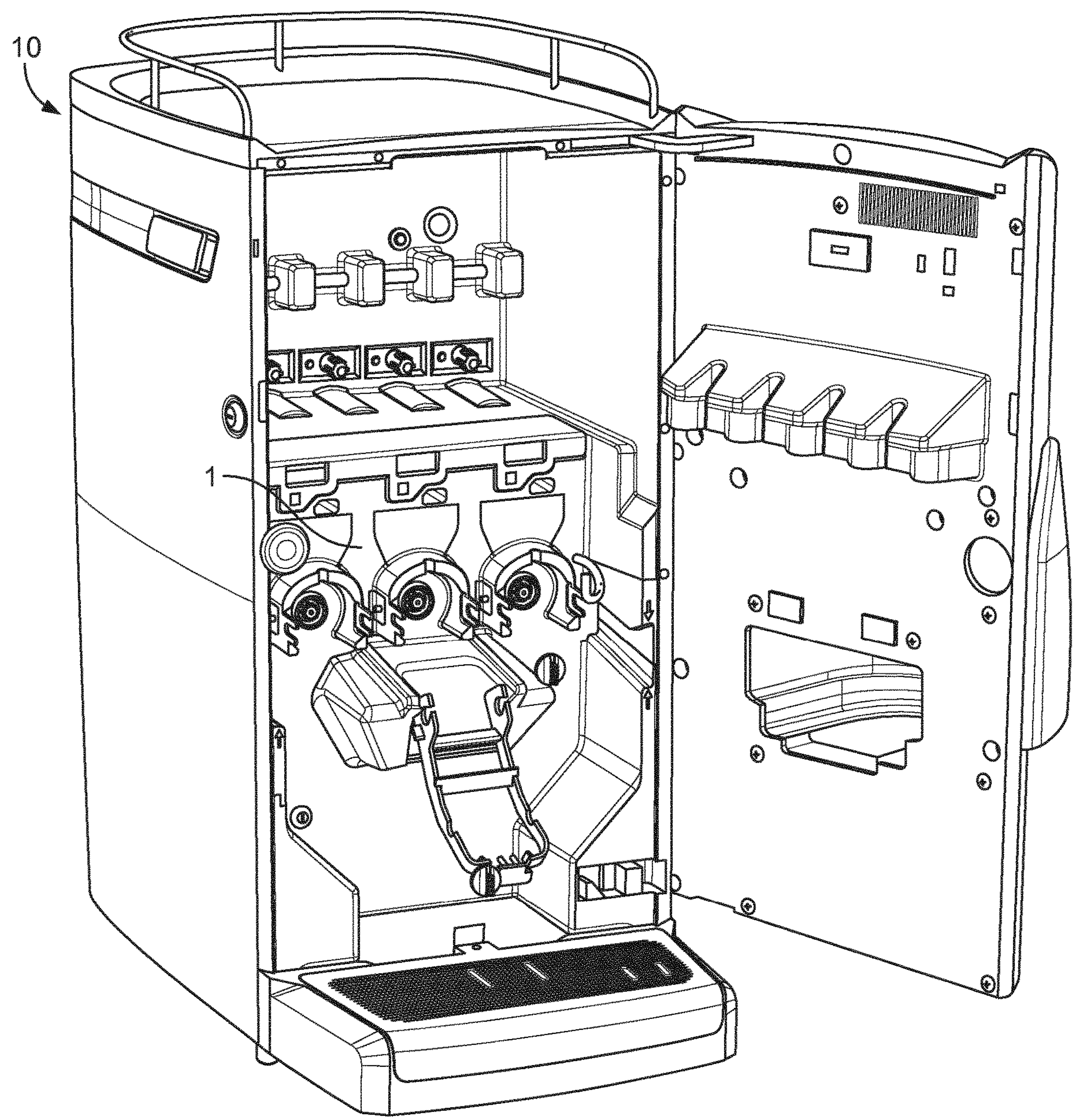

FIG. 1*b* illustrates the apparatus at the step where the chambers 3, the manifold 8 and even the containers 2 have been removed either for cleaning or for reconfiguring the beverage offer of the apparatus. When the operator introduces all these elements back again in the frame 1 of the apparatus, there is a risk that it does not associate correctly the container storing a particular ingredient with the dissolution chamber dedicated to the dissolution of this ingredient with a direct impact on the quality of the beverage.

In addition, when the operator changes the ingredients and the chambers inside the apparatus with the aim of providing a new beverages offer to the customer, for example after the breakfast and before the lunch, the operator shall change the user interface accordingly so that the consumers are aware of this new offer.

All these tasks are time consuming and happen between two rushing periods of the day with the risk of generating errors of reassembling inside the apparatus.

FIGS. 2*a*-2*d* are a schematic views of a system according to the invention.

Figure 2A:
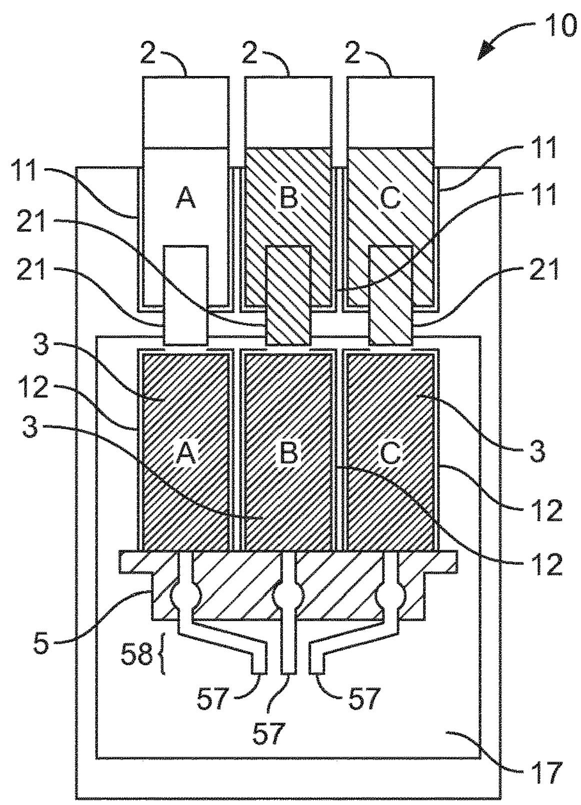

In FIG. 2*a*, the beverage preparation apparatus 10 is represented according to a front view, the front door of the apparatus being removed.

The apparatus 10 is in its operational state ready to prepare beverages. It comprises three containers 2 storing different soluble beverage ingredients A, B and C, such as coffee, milk, decaffeinated coffee. Each of these containers is positioned in the frame in a specific container area 11 or in a specific position of one global container area. The containers comprise dosing devices to dose and dispense the stored ingredient downwardly through container outlets 21 in three corresponding dissolution chambers 3. The doses of ingredient are introduced through the tops of the chambers. Each chamber 3 is designed for mixing the dose of beverage ingredient with a diluent to prepare the beverage. Each chamber 3 presents an internal design configured to dissolve one dedicated type of soluble beverage ingredient, for example chamber A is designed to dissolve the soluble ingredient A. Each dissolution chamber is positioned in the frame in a specific chamber area 12 or in a specific position of one global chamber area. All the chambers are supported by a sub-frame 5 that is removably attached to the main frame 1. This sub-frame comprises a dispensing block enabling the orientation of the final beverage outlet 57 connected to each chamber to a particular final dispensing area 17. In FIG. 2*a*, the dispensing block is designed to dispense all the beverages at the same position, only one cup can be filled.

Figure 2B:
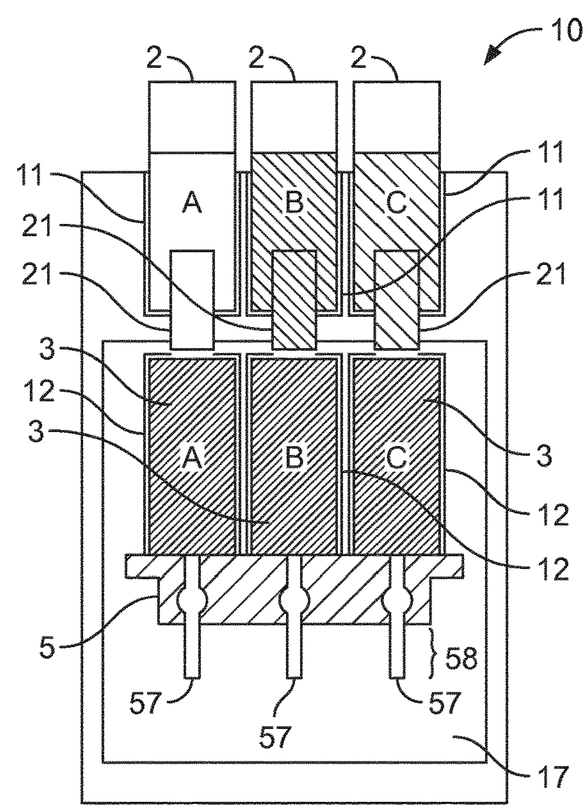

FIG. 2*b* illustrates a beverage preparation apparatus similar to the apparatus of FIG. 2*a* except that the dispensing block is different: it is designed to dispense the beverages of different chambers at different places. Several cups can be ordered and filled simultaneously. This kind of dispensing is particularly adapted for a demand answering a high demand of beverages comprising one component only, for example the preparation of black coffee, tea and chocolate at the breakfast. The dispensing block of FIG. 2*a* is preferred for the preparation of more complex beverages comprising different components such as coffee and foamed milk, this configuration is preferred when the demand is lower, for example in the afternoon or in the evening.

FIG. 2*c* is a vertical cross section view of the apparatus of FIG. 2*a* illustrating the connections between the frame 1, the container 2 storing ingredient A and the corresponding chamber 3 designed to dissolve ingredient A. The container 2 and the chamber 3 are illustrated aside the frame 1 in order to describe each device and illustrate their interactions.

The container 2 comprises a tank 24 and a powder dispensing outlet 21.

The frame comprises a container area 11 configured for positioning the container 2. The container comprises a tank 24, a powder dispensing outlet 21, an integrated dosing device 22 (e.g. an auger extending through the bottom of the tank) and an identification means 23 identifying the nature of the soluble beverage ingredient A stored in the container. The container area 11 comprises a dosing device actuator 15 and an identification means reader 13. The actuator and the reader are positioned in the container area in order to fit with the dosing device 22 and the identifying means 23 respectively when the container is positioned inside the area 11.

The frame comprises a dissolution chamber area 12 configured for positioning the chamber 3. The chamber 3 comprises a top diluent inlet 31*a* and a bottom diluent inlet 31*b*. Yet depending on the type of chamber (in particular depending on its size and its internal geometry), the chamber can comprise one single diluent inlet 31*a* only. The chamber 3 comprises a beverage outlet.

According to the illustrated embodiment, the beverage outlet is connected to a flexible tube 61 that is part of a pinching valve as described hereunder. Yet, according to a more simple embodiment, the beverage outlet can also be a simple opened conduit without any valve.

The chamber 3 comprises an identifying means 34. The dissolution chamber area 11 comprises a dosing device actuator 15 and an identification means reader 13. The actuator and the reader are positioned in the container area in order to fit with the dosing device 22 and the identifying means 23 respectively when the container is positioned inside the area 11.

The chamber area 12 comprises connecting devices 41*a*, 41*b*, such as holes with quick connection means able to cooperate with the diluent inlets, to connect each diluent inlet 31*a*, 31*b* of the chamber to the diluent supply system hold inside the frame 1 of the apparatus. As mentioned above, the chambers can comprise one diluent inlet 71*a* only and accordingly the apparatus can comprise one connecting device 41*a* per chamber only. The chamber area 12 comprises a an identification means reader 13. The connecting devices 41*a*, 41*b* and the reader 13 are positioned in the chamber area in order to fit with the diluent inlets 71*a*, 71*b* and the identifying means 34 respectively when the chamber is positioned inside the area 12.

In the illustrated embodiment, the apparatus comprises a pinching actuator 62 able to pinch the flexible tube 61 connected to the outlet of the chamber. This actuator 62 is hold in the frame 1 of the apparatus. In the alternative embodiment where the beverage outlets of the chambers are a simple opened conduit, the apparatus is devoid of such pinching actuators.

The three container areas 11 of the apparatus are identical and enable the identification of any container positioned inside by reading the identifying means attached to the container. The three containers are externally identical and can be positioned in any container area.

Similarly, the three dissolution chamber areas 12 of the apparatus are identical and enable the identification of any chamber positioned inside by reading the identifying means attached to the chamber. The geometries of the three chamber are externally identical and as a result the chambers can be positioned in any chamber area.

The apparatus comprises a control system 18 operable to control the components of the apparatus.

In one embodiment, the dispensing block 58 configuring the position of the final beverage outlets 57 frame supporting the three chambers is removably attached to the sub-frame 5; that provides an additional level of configuration of the apparatus in addition to the choice of the beverages that can be prepared. According to said embodiment, it is preferred that the removable dispensing block 58 comprises an identification means 59 identifying the configuration of the final beverage dispensing area of the dispensing block. The frame comprises one identification means reader 7 enabling the reading of the identification means 59 of the dispensing block attached to the sub-frame.

FIGS. 2*d* and 2*e* illustrate the pair of container and chamber dedicated to the storage and dissolution of beverage ingredient B and C respectively. The chambers present different identifying means (34B, 34C) and the containers too (23B, 23C).

The system comprises:

a multiplicity of containers 2, the number of containers exceeding the number of container areas 11 in the apparatus, and a multiplicity of chambers 3, the number of chambers exceeding the number of chamber areas 12 in the apparatus.

Accordingly, the operator is enabled to select the configuration of the apparatus in accordance with a specific offer of selected beverages to the consumers (depending on the time of the day (breakfast, lunch dinner), or the period of the year (hot and/or cold beverages). The operator just needs to introduce the beverage ingredient containers 2 corresponding to the beverages of the offer inside the container areas 11 and the chambers 3 corresponding to the preparation of said beverages inside the chamber areas 12. For this last operation, the sub-frame 5 can help the operator to introduce the selected chambers simultaneously inside the frame 1 of the apparatus.

Again, the dispensing blocks 58 of the sub-frame 5 can be selected too during the configuration of the offer.

The Identification Means/Reader

The identification means of the containers, the beverage dissolution chambers and eventually the dispensing blocks of the sub-frame can be selected in the list of a code such as a bar code, a colour, a magnetic or inductive means, a RFID tag, a geometrical shape such as a combination of recess(es) and bulge(s), and combination thereof.

The identification means of the containers can be of a nature different from the identification means of the beverage solution chambers, for example the identification means of the containers can be particular colours, whereas the identification means of the beverage dissolution chambers can be particular shapes. The same applies to the identification means of the dispensing block.

Depending on the nature of the identification means, the identification means readers can be optical readers such as bar code readers, cameras, sensors sensitive to light, electrically conductive readers. The identification means can comprise and electrically conductive section that can be become part of an electric circuit and can cause a measurable change or close a particular circuit out of different circuits.

an RFID reader.

Control System

Figure 3:
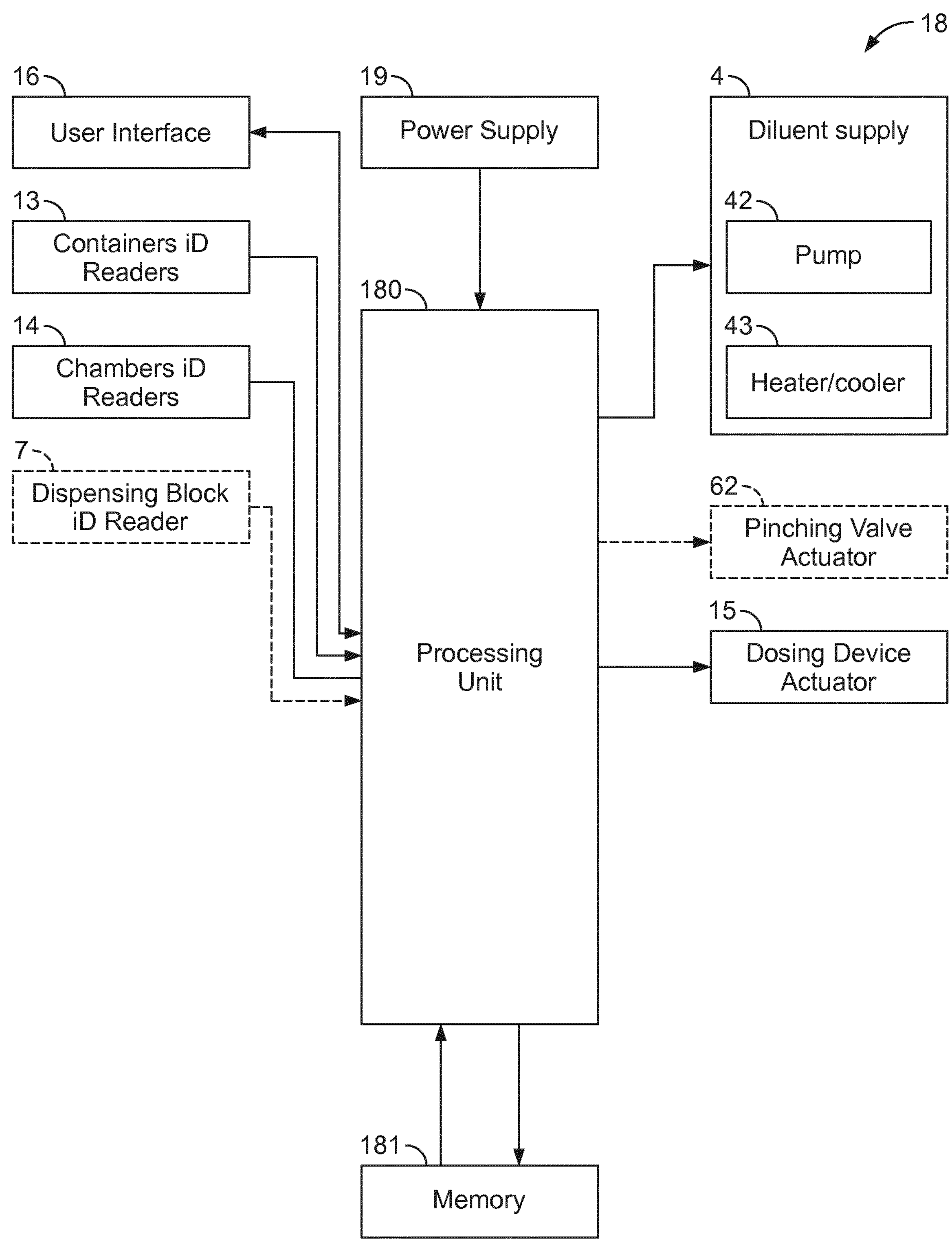
FIG. 3 is a schematic representation of an embodiment of the control system of the system of FIGS. 2*a*-2*e*.

With reference to FIG. 3, the control system 18 will now be considered. The control system includes at least a processing unit 180, a power supply 19 and a memory 181 and is operable to control:

a first level of components to perform the beverage preparation operation including in particular the diluent supply 4, the dosing device actuator 15, optionally the pinching valve actuator 62, and a second level of components including the identification means readers 13, 14, and optionally 7, and the user interface 16.

The user interface 16 comprises hardware to enable the operator and the consumer to interface with the processing unit 70, by means of a user interface signal. More particularly, the user interface receives commands from an operator or a consumer; the user interface signal transfers the said commands to the processing unit 70 as an input. The commands may, for example, be an instruction to execute a beverage preparation process for a consumer and/or to adjust an operational parameter of the beverage preparation apparatus for an operator and/or to power on or off the beverage preparation apparatus. The processing unit 180 may also output feedback to the user interface 16 as part of the beverage preparation process, e.g. to indicate the beverage preparation process has been initiated or that a parameter associated with the process has been selected.

The hardware of the user interface 16 may comprise any suitable device(s), for example, the hardware comprises one or more of the following input means: buttons, such as a joystick button or push button, joystick, LEDs, graphic or character LCDs, graphical screen with touch sensing and/or screen edge buttons. The user interface 16 comprises at least one output means too in order to provide information, this output means is preferably graphic or character LCDs, graphical screen with touch sensing and/or screen edge buttons. The user interface 16 can be formed as one unit or a plurality of discrete units. For more complicated hardware configurations the user interface 16 can comprise a separate processing unit (examples of which are provided below) to interface with the master processing unit 180.

The identification means readers 13, 14, 17 are operable to provide an input signal to the processing unit 180 for identifying the nature of ingredients stored in each container, the nature of the ingredient each chamber is designed to dissolve and eventually the type of dispensing block in the sub-frame holding the chambers. The input signal can be an analogue or digital signal.

The processing unit 180 is operable to: receive an input, i.e. the commands from the user interface 16 and/or the signal of the identification means readers 13, 14, and optionally 7, process the input according to program code (or programmed logic) stored on the memory unit 181, provide an output, which is generally a beverage preparation process. More specifically the output may comprise the operation of: a dosing device actuator 15 to dose a soluble beverage ingredient from a container and supply the said dose to the beverage dissolution chamber positioned under said container, the diluent supply 4 (i.e. operation of the diluent pump 42 and diluent heater or cooler 43 to supply fluid to the chamber), eventually the pinching valve actuator 62 if present (to dispense the beverage to a drinking cup). The processing unit 180 generally comprises memory 181, input and output system components arranged as an integrated circuit, typically as a microprocessor or a microcontroller. The processing unit 180 may comprise other suitable integrated circuits, such as: an ASIC, a programmable logic device such as a FPGA, an analogue integrated circuit, such as a controller. The processing unit 180 may also comprise one or more of the aforementioned integrated circuits. An example of the latter is several integrated circuits arranged in communication with each other in a modular fashion e.g. a slave integrated circuit to control the user interface 16 in communication with a master integrated circuit to control the components dedicated to the beverage preparation 4, 62, 15.

The processing unit 180 generally comprises a memory unit 181 for storage of instructions as program code and optionally data. To this end the memory unit 181 typically comprises: a non-volatile memory e.g. EPROM, EEPROM or Flash for the storage of program code and operating parameters as instructions, volatile memory (RAM) for temporary data storage. The memory unit may comprise separate and/or integrated (e.g. on a die of the semiconductor) memory. For programmable logic devices the instructions can be stored as programmed logic.

In particular the memory unit 181 stores recipes for the preparation of beverages. IN particular, the memory unit stores recipes for each pair of container and chamber enabling the preparation of a beverage from a particular ingredient. The identification of one pair enables the control of the components such as the diluent supply, and the dosing actuator to prepare the corresponding beverage.

The power supply 19 is operable to supply electrical energy to the said controlled components, the processing unit 180 and components associated therewith. The power supply 19 may comprise various means, such as a battery or a unit to receive and store energy from a mains electrical supply. The power supply 19 may be operatively linked to part of the user interface 16 for powering on or off the beverage preparation apparatus 1.

Figure 4:
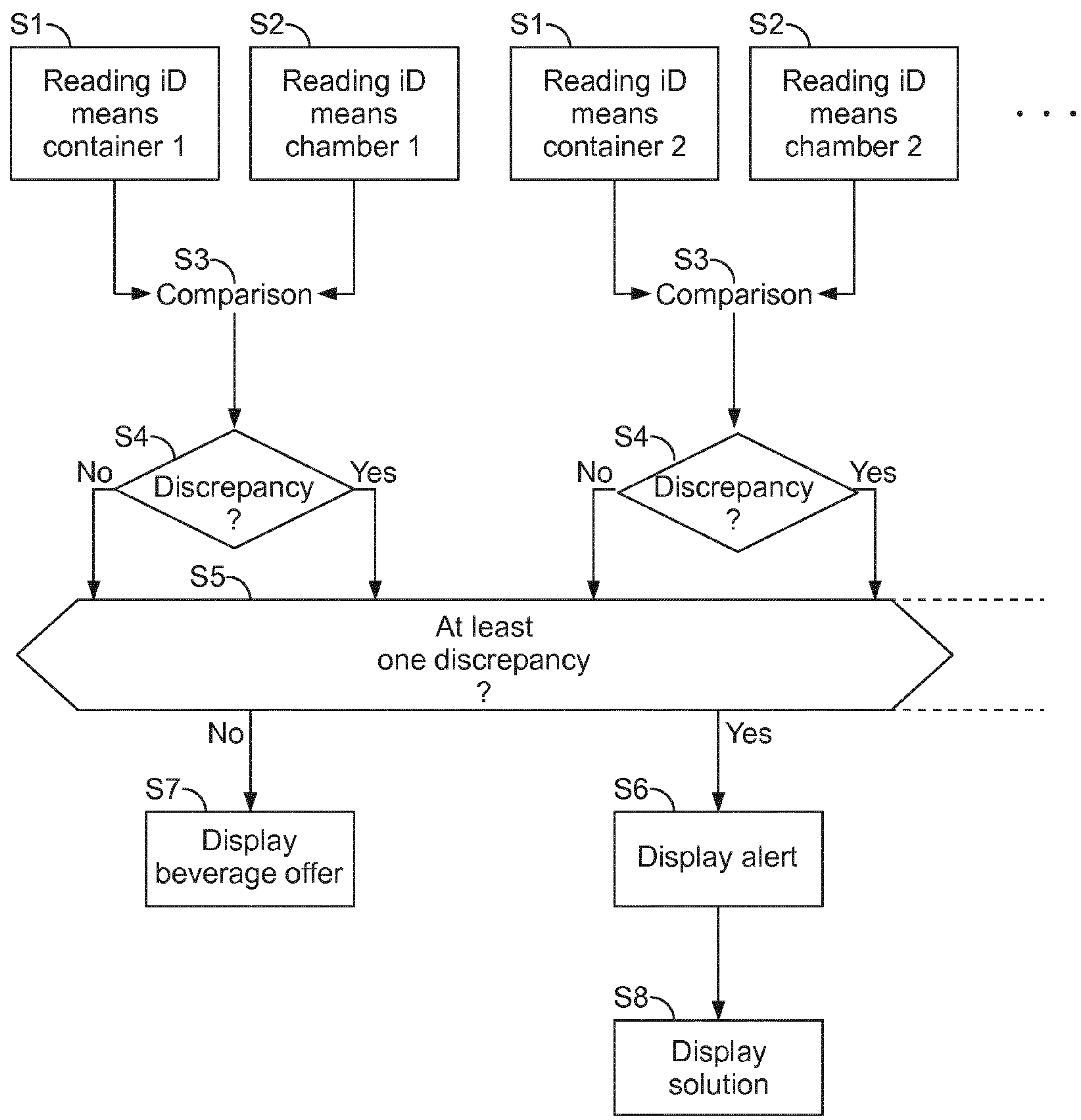
FIG. 4 represents as a block diagram an example of the process of checking the adequacy of the pairs of chamber and container positioned in the apparatus, FIGS. 5*a* and 5*b* schematically illustrates the appearance of the user interface at different operational states.

The control system of the apparatus is configured for comparing, for each pair of a container housed in a container area and a dissolution chamber housed in the chamber area positioned under the container area, the identification means of the dissolution chamber and the identification means of the container as described in reference to FIG. 4.

As a prerequisite for said process, a particular configuration of the apparatus has been manually set by the operator, that is to say that the operator has defined a particular offer of beverages to be prepared by the apparatus and has introduced the containers and the chambers enabling the preparation of the beverages of said offer.

Once containers and chambers are positioned, for each pair, the control system reads at step S1 the identification means of the container, and simultaneously at step S2, the control system reads the identification means of the chamber positioned under the container. In both cases the identification means provides the nature of a soluble beverage ingredient, the ingredient that is stored in the container and the ingredient the chamber is designed to dissolve.

The natures of the ingredient stored in the container and the ingredient the chamber is designed to dissolve are compared at step S3.

Based on the result of the comparison, it is judged in a step S4 whether a discrepancy exists or not between said natures.

These steps S1 to S4 are repeated either successively or simultaneously for each pair of chamber and container positioned in the apparatus.

At step S5, the results of the comparison for all pairs are collected. If at least one discrepancy is detected at the steps S4, one or several actions are taken at step S6. A warning is displayed on the user interface of the apparatus. Preferably, the user interface displays information about the pair(s) for which a discrepancy has been detected and prompting the operator to change, in said pair(s), the container, the chamber or even both of them. In an optional step S8, the user interface can display the solution to be implemented and urge the operator to invert at least two containers or two chambers.

If, for all pairs, no discrepancy between nature is detected, it is judged that all the containers and the chambers have been correctly selected and positioned inside the apparatus and step S7 is implemented. The user interface displays the offer of beverages corresponding to the pairs introduced inside the apparatus. At this point, the operator is able to check if the offer he/she has defined corresponds to what is installed and a consumer is able to order a beverage from this offer.

Figure 5A:
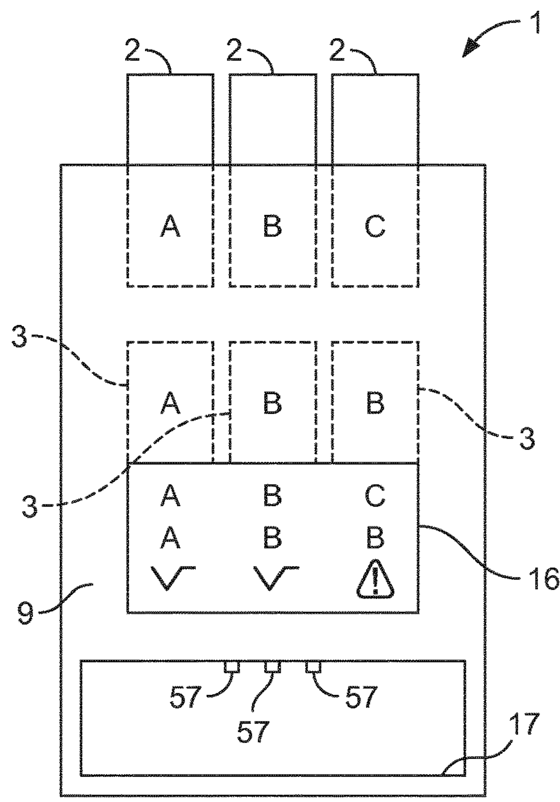
Figure 5B:
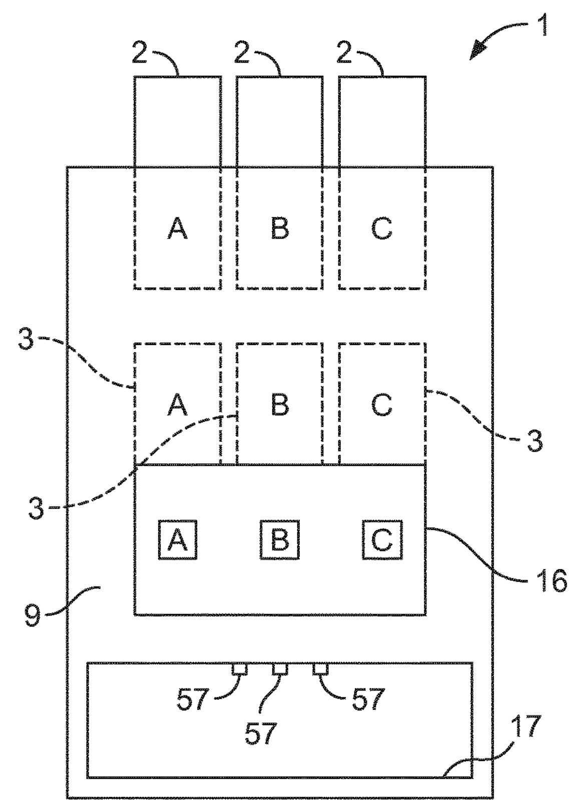

FIGS. 5*a* and 5*b* schematically illustrates the appearance of the user interface at step S5 and S6 respectively.

The figures shows the front door of the apparatus 1 once the chambers 3 and the containers 2 have been positioned in the respective chamber and container areas. The front door 9 hides the chambers 3 and a part of the containers 2. The door 9 comprise an opening defining a dispensing area 17 in which the final dispensing outlet 57 of each chamber emerges; a drinking cup can be positioned just under to receive the prepared beverage.

The door comprises a display 16 configured to provide information to the operator or the consumers.

FIG. 5*a* illustrates the situation where the containers contain three different soluble beverage ingredients A, B and C and the operator has positioned three dissolution chambers in the apparatus, the chamber positioned under the container storing the ingredient C is designed to dissolve the ingredient B. In that situation, at steps S4, when the control system compares the identification means of the dissolution chamber and the identification means of the container for each pair of a container and a dissolution chamber positioned one above the other, the control system detects a difference between the nature (C) of the ingredient the container on the right stores and the nature (B) of the ingredient the chamber on the right is able to dissolve. At the further step S5, it is noticed that there exists one discrepancy and step S6 is applied: the control system alerts the operator by displaying an alert message or the information on the display 16. Preferably, the natures of the ingredients for each container and chamber is displayed too in order to help the operator:

- to decide if either the right container or the right chamber must be changed,
- to control that the other containers and chambers correspond to those he/she intended to load.

FIG. 5*bb* illustrates the situation where the containers contain three different soluble beverage ingredients A, B and C and the operator has positioned three dissolution chambers in the apparatus correctly. In that situation, at step S4, when the control system compares the identification means of the dissolution chamber and the identification means of the container for each pair of a container and a dissolution chamber positioned one above the other, the control system detects no discrepancy for any pair. In that situation, at the further step S5, it is noticed that there exists no discrepancy and step S7 is applied: the control system is configured to show on the display 16 information about the natures of the beverages that can be ordered from the dispenser.

Figure 6A:
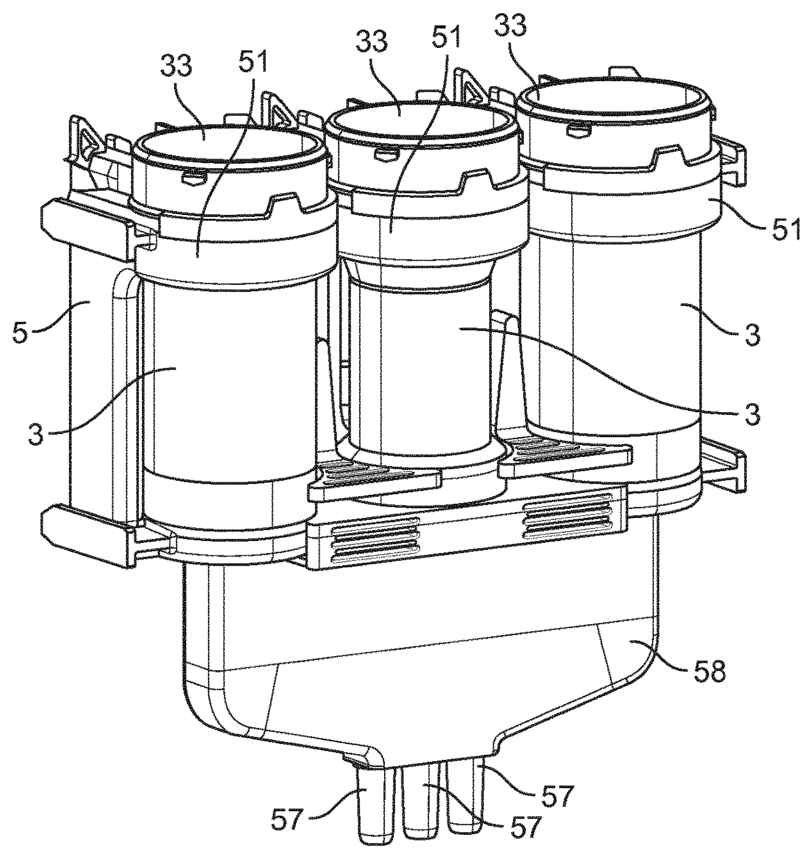
FIGS. 6*a*-6*b* are perspective views of the front and back sides of the first mode of the sub-frame holding three chambers.
Figure 6B:
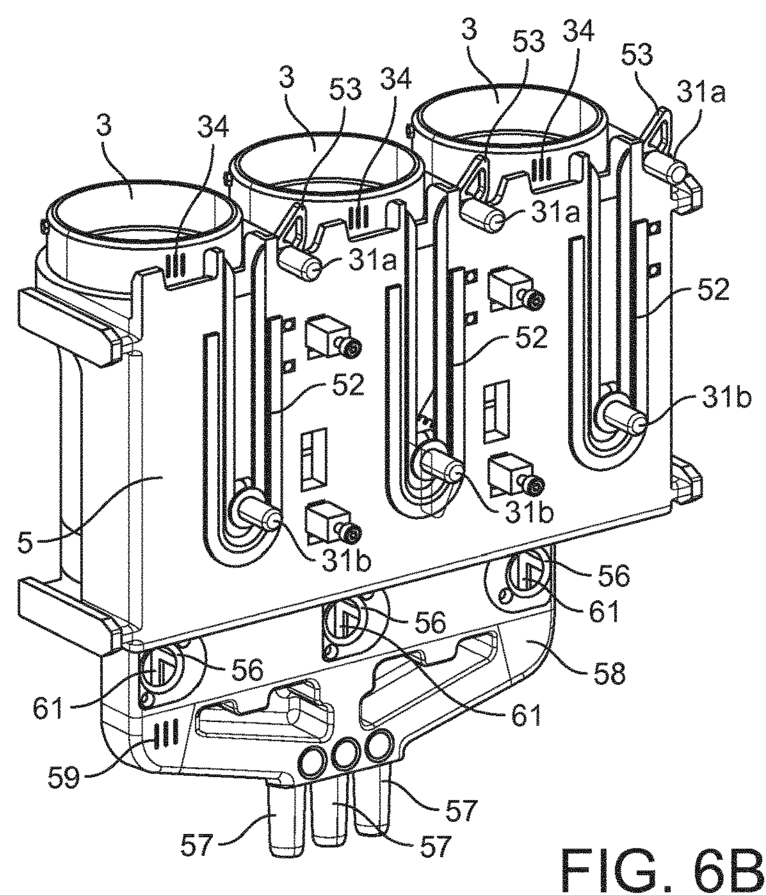

FIGS. 6*a*-6*b* illustrates the first mode of the sub-frame 5 mentioned in FIGS. 2*a*-*d* and holding three chambers 3. The sub-frame comprises three sub-areas 51 in which each chamber can be positioned. In particular the chambers can be slid from above in three rings guiding the movement of the operator. On the back side, the sub-frame presents three slots 52. Each slot is designed to receive the bottom diluent inlet 31*b* of one chamber. These slots enable the correct orientation of the diluent inlet in the sub-frame, preferably in order to orientate the diluent inlets 31*b* perpendicularly to the back side of the sub-frame. Consequently, when the operator positions the sub-frame in the receiving area of the frame, the movement of the operator is a horizontal sliding movement enabling easy connection of the diluent inlets with the holes in the surface of the receiving area.

The sub-frame comprises three indentations 53 enabling too the other top diluent inlets 31*a* to nest in the sub-frame.

The chambers are well immobilised and oriented inside the sub-frame.

The back side of the sub-frame comprises three holes 56 enabling the introduction and removal of the pinching actuators to pinch the flexible tubes hold in the sub-frame. Downstream the flexible tubes 61, conduits drive the beverages to the final dispensing outlets 57. In the illustrated embodiment, the three outlets dispense their beverages in the same area, for example in the same cup. Alternatively, the three outlets can be designed to dispense their beverages in different areas, for example in three different cups.

Each chamber 3 comprises an identification member 34. In the illustrated embodiment the identification means is a bar code. The sub-frame enables the reading of the identification means by a reading device in the frame the apparatus once the sub-frame is positioned in the apparatus.

Figure 7:
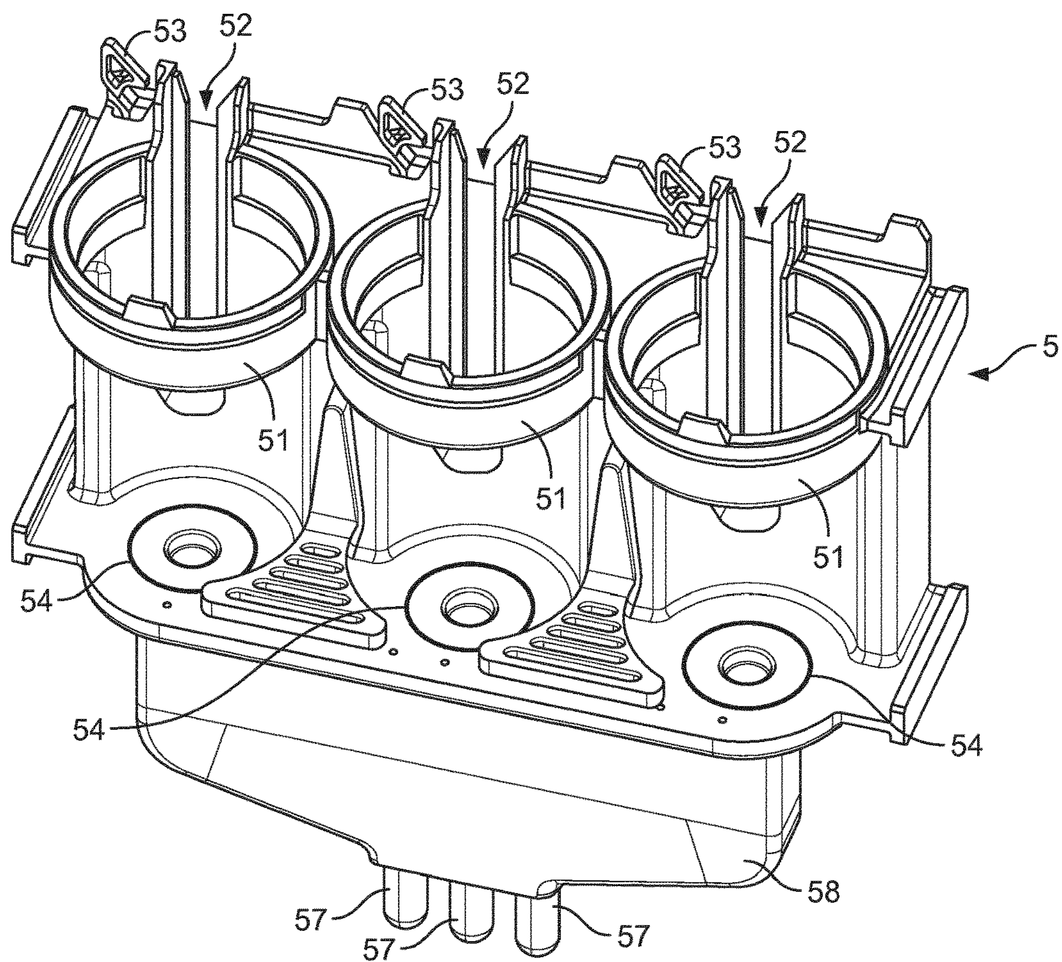
FIG. 7 illustrates the sub-frame of FIGS. 6*a*-*b* without the chambers.

FIG. 7 illustrates the sub-frame of FIGS. 6*a*-*b* the chambers being removed therefrom.

The bottom part of the sub-frame comprises threes conduits 54 designed to cooperate with the beverage outlet 33 (see FIGS. 8*a*-*b*) of the chambers and leading to the flexible tubes of the pinching valves.

Figure 8:
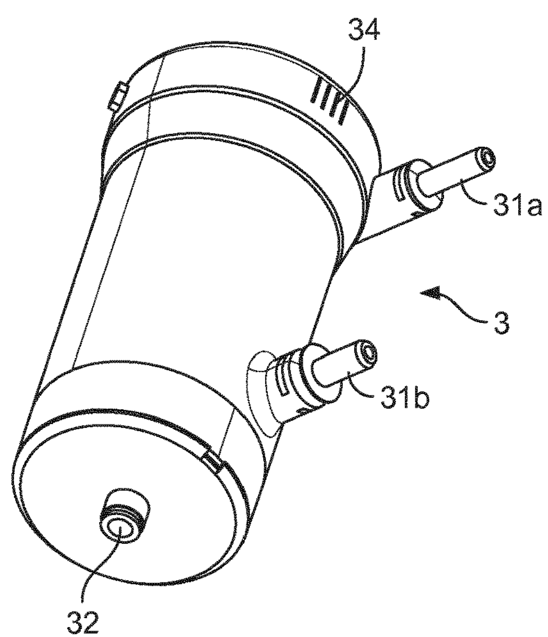
FIG. 8 is a bottom view of one chamber of FIGS. 6*a*-*b*, FIGS. 9*a*-*b* are side views of a set of two sub-frames according to the second mode.

FIG. 8 is a bottom view of one chamber 3. At its bottom, the chamber comprises beverage outlet 32 cooperating with the outlet 44 in the sub-frame.

Figure 9A:
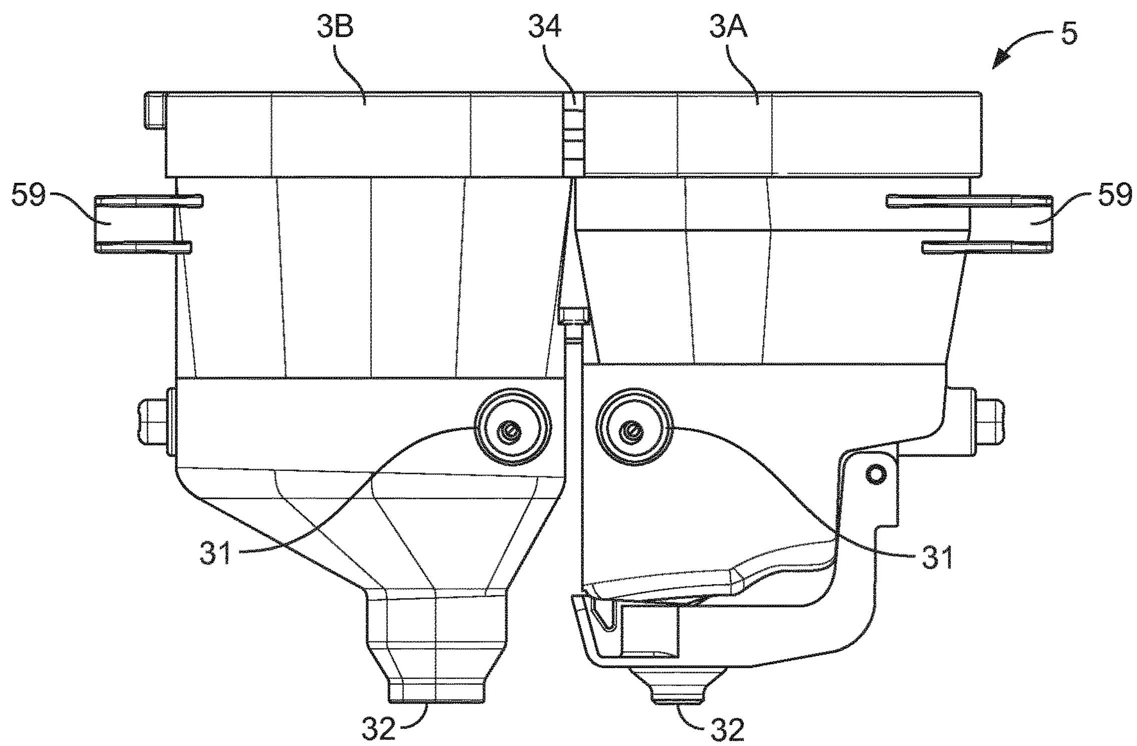
Figure 9B:
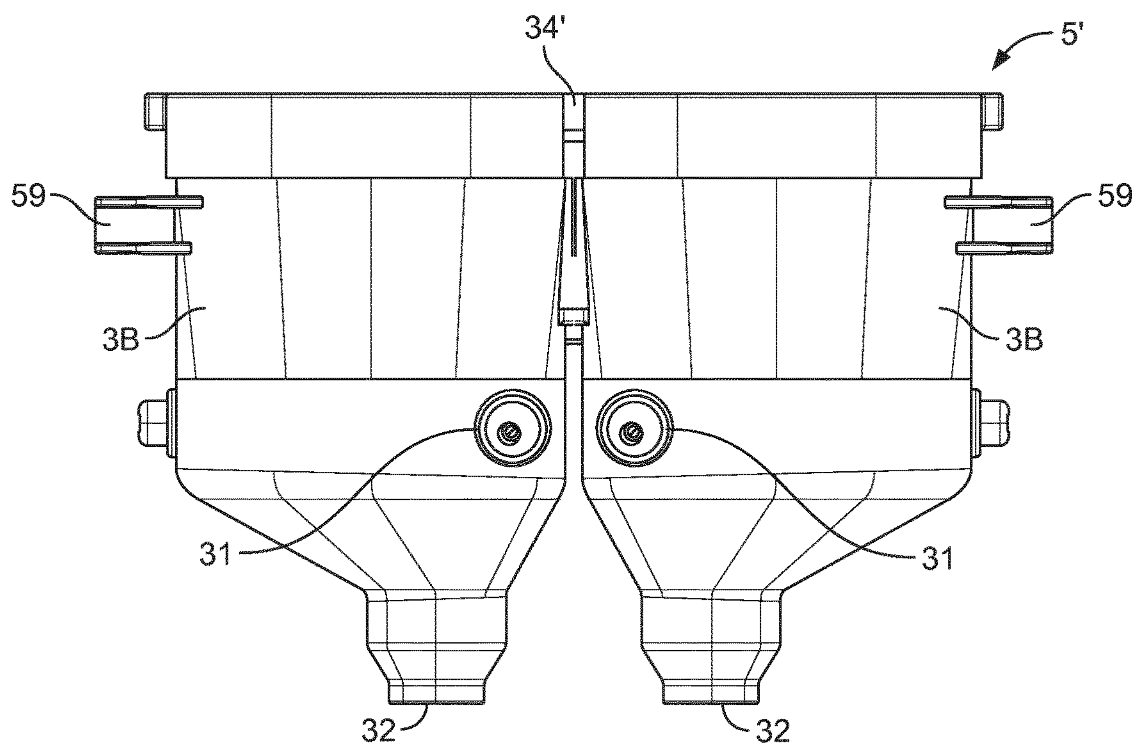

FIGS. 9*a* and 9*b* illustrate a set of two sub-frames 5, 5' mentioned in FIGS. 2 a-d according to the second mode of the invention and holding two chambers 3.

In FIG. 9*a*, the sub-frame 5 holds two dissolution chambers 3A, 3B and the assembly of the sub-frame 5 and the two chambers 3A, 3B is made of one single piece of material. In the middle of the sub-frame, the two chambers are attached one to the other by the external surfaces of their lateral side walls.

On the lateral side of the sub-frame 5, guiding rails 59 are moulded on the external surface of their lateral side walls. The chambers 3A, 3B present different designs, in particular to dissolve different ingredients, such as instant coffee and milk powder. In the apparatus (not illustrated), the front face of the receiving area comprises holes positioned to enable the connection of the three diluent inlets 31 with the diluent supply.

The sub-frame comprises an identification means 34, such as a bar code, identifying the nature of ingredient each chamber 3A or 3B is designed to dissolve and the physical position of these chambers in the sub-frame. When the sub-frame 5 is positioned in the chamber area of the apparatus, the identification means cooperate with the reader of the apparatus.

In FIG. 9*b*, the sub-frame 5' is similar to the precedent sub-frame 5 except that it comprises two identical chambers 3B. The identification means 34 identifies the nature of ingredient the chambers 3B are designed to dissolve and the physical position of these chambers in the sub-frame.

Both sub-frames 5, 5' can be alternatively used in the same apparatus wherein the chamber area comprises holes positioned to receive the diluent inlets 31 of the chambers and an identification means reader to read the identification means 34, 34'. With this set of different sub-frames 5, 5', the operator is able to rapidly customise the beverages proposed in the beverage preparation apparatus. In a further step of introducing the ingredient container in the apparatus, the system helps the operator to check that the containers and the chambers match together.

The system of the present invention presents the advantage of enabling the operator to decide his/her own configuration of beverage offer and to build the apparatus that provides this offer.

Thanks to the use of several sub-frames, the system enables the operator to prepare pre-assembled series of chambers and to rapidly change from one to another in the course of the day.

The system of the present invention presents the advantage of enabling the manufacturer of the apparatus to propose the sale of sub-frames with pre-assembled series of chambers in order to upgrade or complete the offer of already commercialised apparatus.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS beverage preparation apparatus 10
frame 1
container area 11
dissolution chamber area 12
container identification means reader device 13
chamber identification means reader device 14
dosing device actuator 15
user interface 16
final dispensing area 17
control system 18
processing unit 180
memory 181
power supply 19
container 2
outlet 21
dosing device 22 container identification means 23
tank 24
chamber 3
diluent inlet 31*a*, 31*b*
beverage outlet 32
opened top 33
chamber identification means 34, 34'
diluent supply 4
holes 41*a*, 41*b*
pump 42
heater/cooler 43
sub-frame 5, 5'
sub-areas 51
slot 52
indentation 53
outlet 54
holes 56
final dispensing outlets 57
dispensing block 58
dispensing block identification means 59
flexible tube 61
pinching actuator 62
dispensing block identification means reader 7
manifold 8
front door 9

The invention claimed is:

1. A system comprising:

a beverage preparation apparatus, wherein the apparatus comprises a main frame supporting the functional components of the apparatus, part of the components comprising:

a diluent supply system, a container area configured for positioning at least two removable containers in the frame, the containers being configured for storing and dispensing a soluble beverage ingredient, and the container area comprising at least one identification member reader device to identify each container or a combination of containers hold in the container area, a dissolution chamber area configured for positioning at least two removable dissolution chambers so that each dissolution chamber is positioned under one container so that dissolution chamber receives a dose of soluble beverage ingredient from the container positioned above the dissolution chamber, and each dissolution chamber area comprising at least one connection to the diluent supply system, the dissolution chamber area comprising at least one identification member reader configured to identify each dissolution chamber or a combination of chambers positioned in the dissolution chamber area, and a user interface, and a multiplicity of containers, each container being configured for storing and dispensing a soluble beverage ingredient, and each container or a combination of containers being designed to be removably positioned inside the container area of the apparatus, and wherein each container or combination of containers comprises an identification member identifying the nature of the soluble beverage ingredient each container is designed to store, and a multiplicity of dissolution chambers, each dissolution chamber being configured for preparing a beverage from a dose of soluble beverage ingredient and a dose of diluent, and each chamber comprising:

at last one diluent inlet designed to removably cooperate with at least one connection to the diluent supply system of the chamber area, one powder inlet designed to receive the dose of soluble beverage ingredient from the container positioned in the container area above the chamber area, and one beverage dispensing outlet, and each dissolution chamber presenting an internal design configured to dissolve one dedicated type of soluble beverage ingredient, each dissolution chamber or a combination of chambers being designed to be removably positioned inside the chamber area of the apparatus, and each dissolution chamber or the combination of chambers comprises an identification member identifying the nature of the soluble beverage ingredient each dissolution chamber is designed to dissolve, and the apparatus comprises a control system configured for comparing, for each pair of a container housed in the container area and the dissolution chamber housed in the chamber area positioned under the container area and receiving the soluble beverage ingredient from the container, the identification member of the dissolution chamber or of the combination of chambers and the identification member of the container or of the combination of containers.

2. The system according to claim 1, wherein if, for one pair of a container and a dissolution chamber receiving the soluble beverage ingredient from the container, a discrepancy between the nature of the soluble beverage ingredient the dissolution chamber is designed to dissolve and the nature of the soluble beverage ingredient the container is designed to store is detected, then an alert is displayed through the user interface.

3. The system according to claim 1, wherein if, for all pairs of a container and a dissolution chamber receiving the soluble beverage ingredient from the container, no discrepancy between the nature of the soluble beverage ingredient the dissolution chamber is designed to dissolve and the nature of the soluble beverage ingredient the container is designed to store is detected, then the natures of the beverages able to be prepared by the pairs of container and dissolution chamber are displayed through the user interface.

4. The system according to claim 1, wherein the apparatus comprises a sub-frame, the sub-frame being removably attached to the main frame, and the sub-frame being configured for holding a combination of dissolution chambers to be positioned in the dissolution chamber area of the apparatus, each of the chamber comprising an identification member, and the sub-frame being designed to position the identification member of each dissolution chamber hold in the sub-frame in relation to one identification member reader.

5. The system according to claim 4, wherein the sub-frame comprises sub-areas, each of these sub-areas being configured for receiving one dissolution chamber and for orienting the conduit of the at least one diluent inlet of the chamber.

6. The system according to claim 4, wherein the sub-frame comprises at least two dispensing conduits, each dispensing conduit cooperating with the dispensing beverage outlet of one dedicated chamber and supplying beverage to a final beverage dispensing area, and wherein the dispensing conduits are designed in a dispensing block of the sub-frame.

7. The system according to claim 6, wherein the system comprises at least two sub-frames (5), wherein the at least two sub-frames differ by the configuration of dispensing block, and wherein each sub-frame comprises an identification member identifying the configuration of the dispensing block, and wherein the frame comprises one identification member reader device able to identify the sub-frame, and wherein the control system of the apparatus is configured for adapting the display of the user interface.

8. The system according to claim 1, wherein the apparatus comprises a sub-frame the sub-frame being removably attached to the main frame, and the sub-frame being configured for holding a combination of dissolution chambers to be positioned in the dissolution chamber area of the apparatus, wherein the chambers are non removable form the sub-frame, and wherein the sub-frame comprising an identification member of the combination of chambers, said identification member identifying:

the nature of the soluble beverage ingredient each of the dissolution chamber of the combination is designed to dissolve, and the physical position of each chamber in the sub-frame, and wherein the sub-frame is designed to position the identification member in relation to one identification member reader in the chamber area.

9. The system according to claim 8, wherein the system comprises a multiplicity of sub-frames, the sub-frames differing by the type and/or the position of the chambers hold in each sub-frame.

10. The system according to claim 8, wherein the system comprises a multiplicity of sub-frames, the sub-frames differing by the orientation of the beverage outlets of the chambers hold in each sub-frame.

* * * * *